United States Patent Office 3,356,947

Patented Dec. 5, 1967

3,356,947

WAVE-SIGNAL DISPERSION CORRECTING NETWORK

Michael J. Di Toro, Massapequa, N.Y., assignor to Cardion Electronics, Inc., a corporation of Delaware Filed Dec. 23, 1963, Ser. No. 332,492
6 Claims. (Cl. 325—42)

ABSTRACT OF THE DISCLOSURE

A network for correcting for dispersion and distortion of a signal transmitted through a communication channel or link subject to multipath and/or group delay, such as the earth-ionosphere duct, comprises two time-delay transmission-line portions, in cascade, the first portion having an impulse transfer function determined by certain mathematical formulae developed in the specification and the second portion having a transfer function which is the time-reverse of the impulse response of another transfer function determined by other mathematical formulae developed in the specification.

This invention relates to correcting networks for wave-signal translating channels and particularly to such networks useful in channels of the type including a link subject both to noise and dispersion and distortion and particularly to dispersion and distortion arising from multipath, group delay distortion, etc., for example the earth-ionosphere duct, and effective to cause intersymbol interference.

It is well known that single-path signal-translating channels having moderate signal-to-noise ratios and a linear phase-frequency characteristic to a cutoff frequency of $f_c$ can ideally translate, without intersymbol interference, pulses of various amplitudes at the rate of about $2f_c$ pulses per second. Most current data-transmission channels achieve only a fraction of such a pulse rate, either because their nonlinear phase-frequency characteristics cause at the output a dispersion or lengthening of the time of each pulse transmitted much beyond the theoretical value $\frac{1}{2}f_c$ or because of unintentional multipath links in the channel which give rise to ghosts or side pulses which may be of either greater or lesser amplitude than the main pulse and of either polarity, or because the channel is subject to both of these distorting factors.

It is also well known that in signal-translating channels including a multipath link, for example the earth-ionosphere duct, the character of the multiple paths may vary rapidly with time. It is desirable that correcting apparatus for eliminating intersymbol interference be adjustable to take into account the time variability of the multipath link.

In applicant's copending applications Ser. No. 180,456, filed Mar. 19, 1962, now Patent No. 3,206,687, dated Sept. 14, 1965, and Ser. No. 201,148, filed June 8, 1962, now Patent No. 3,206,688, dated Sept. 14, 1965, there are described and claimed apparatus for correcting for signal dispersion and distortion in systems of the type described and effective substantially to eliminate intersymbol interference. For high-speed random serial data transmission, the effects of both noise and intersymbol interference arising from dispersion and distortion in the translating channel combine in a random and uncorrelated manner. In such cases, it is a desirable objective to reduce the mean variance between the mutilated received signal and a delayed clean transmitted signal. The present invention represents an implementation of this objective and constitutes an improvement upon and an extension of the invention described and claimed in both aforesaid copending applications.

It is an object of this invention, therefore, to provide a new and improved correcting network for a wave-signal translating system, including a noisy signal dispersing and distorting link, which reduces signal mutilation from noise and intersymbol interference to a minimum.

It is another object of the invention to provide a new and improved correcting network for a wave-signal translating system, including a signal dispersing and distorting link, which reduces intersymbol interference to a minimum irrespective of whether the pulse arriving first is of a greater or lesser amplitude than, or of the same or different polarity from, that of succeeding pulses.

It is another object of the invention to provide a new and improved correcting network for a wave-signal translating system, including a signal dispersing and distoring link, which is effective to correct for any type of dispersion and distortion due to multipath transmissions, group delay distortion, etc., and combinations thereof.

It is a still further object of the invention to provide a new and improved correcting network for a wave-signal translating system, including a signal dispersing and distorting link, which reduces intersymbol interference to a minimum and in which the correcting network may be adjusted to compensate for variations of the transfer characteristic of the link with respect to time.

In accordance with the invention, there is provided in a wave-signal translating channel including a link subject to undesired noise and to signal dispersion and multipath distortion effective to convert an input delta-function signal into a dispersed waveform extending substantially beyond the reciprocal of twice the baseband width of the link, thereby giving rise to intersymbol interference in the output signal thereof, and in which the transfer function of the link has one or more zeros in the right-hand p-plane, a correction network for substantially reducing said noise and intersymbol interference comprising an input circuit for supplying a signal translated by said link, an output circuit, and a wave-signal correction transmission line coupling the input circuit and the output circuit and having a predetermined time delay and including two portions coupled in cascade, a first of such portions having a transfer function represented by the expression $(1/\phi_1)$ and the second of such portions having a transfer function corresponding to that of filter matched to the impulse response of a network having a transfer function represented by the expression:

$$(\bar{S}_{m_{t_d} m_r}/\bar{\phi}_2)_m$$

where the several symbols and parameters have the significance set forth hereinafter.

For a better understanding of the present invention, together with other and further objects thereof, reference is had to the following description, taken in connection with the accompanying drawings, while its scope will be pointed out in the appended claims.

Referring now to the drawings:

FIG. 1 is a schematic representation of a dual-path high-frequency earth-ionosphere communication channel;

FIGS. 2*a*–2*c*, inclusive, are graphs illustrating certain of the transmission characteristics of the system shown in FIG. 1;

FIGS. 3*a*–3*d*, inclusive, illustrate prior methods and apparatus for correction of particular distortion characteristics of the system of FIG. 1;

Figure 2A:
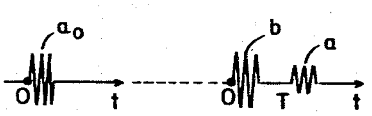
Figure 3A:
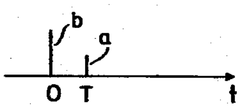
Figure 2B:
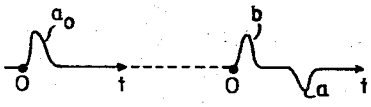
Figure 3B:
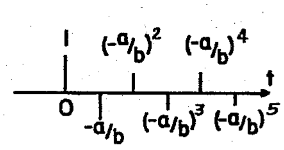
Figure 2C:
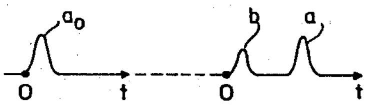
Figure 3C:
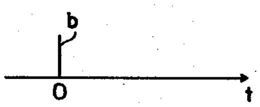
Figures 3D, 4:
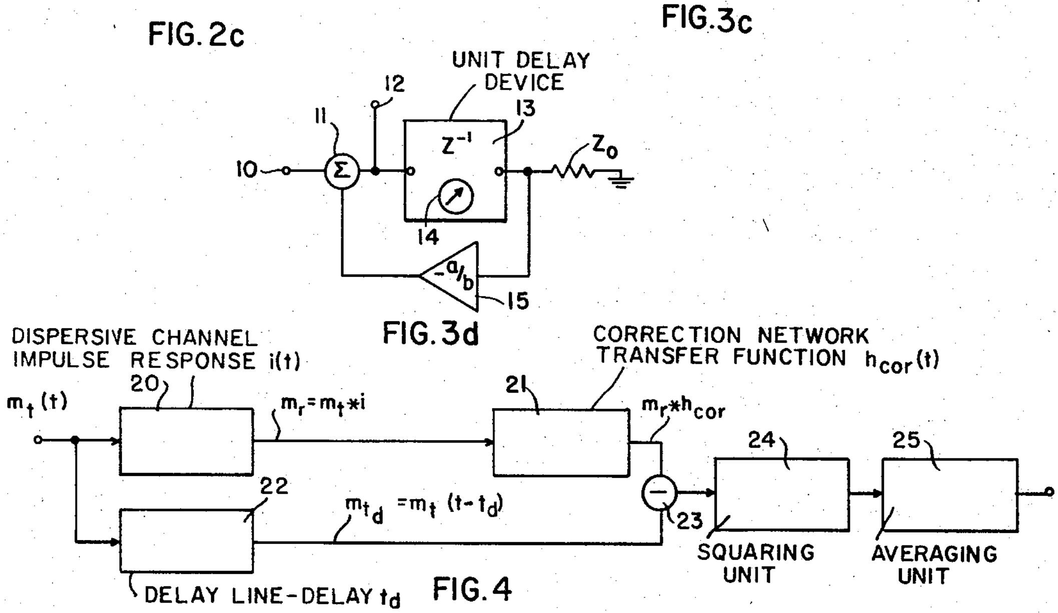
FIG. 4 is a schematic generalized block diagram indicating the communication channel, a correction network therefor, and means for assessing its performance.
Figure 5:
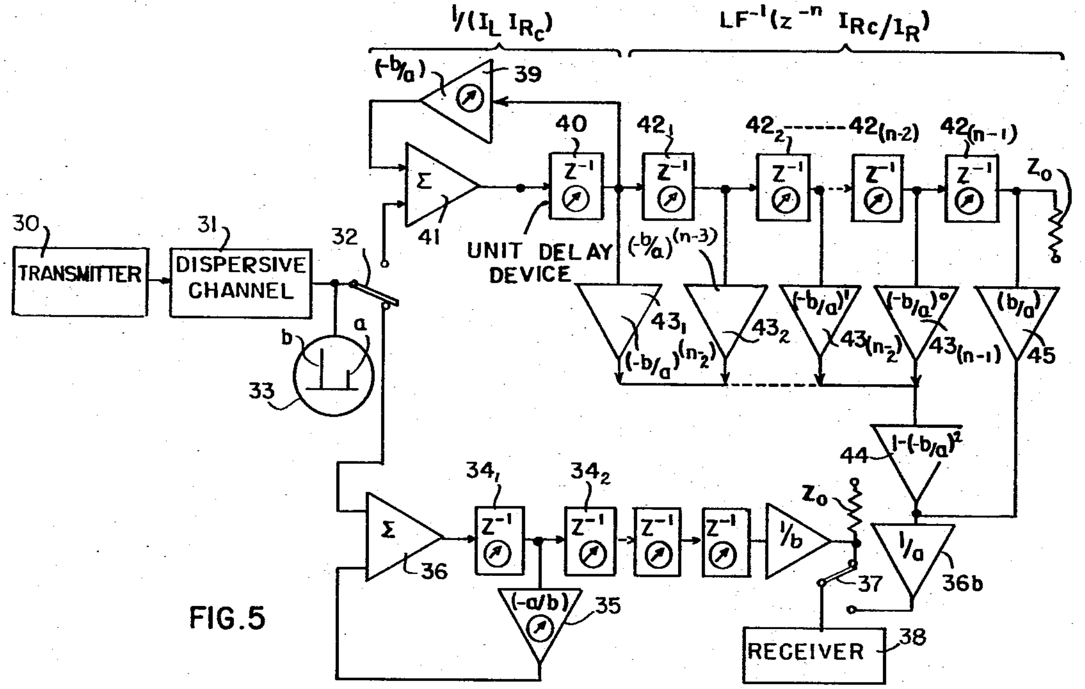
FIG. 5 is a schematic block diagram of a wave-signal translating system embodying the invention.
Figure 6A:
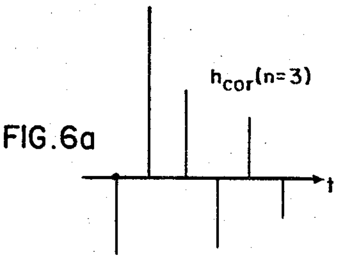
Figure 6B:
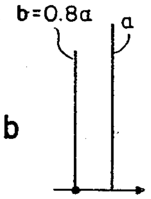
Figure 6C:
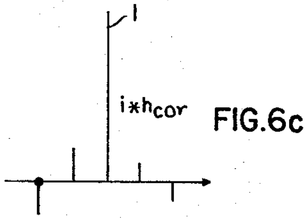
Figure 7:
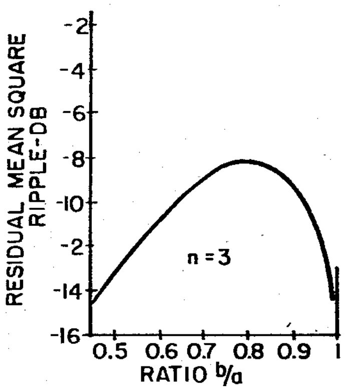
Figure 8:
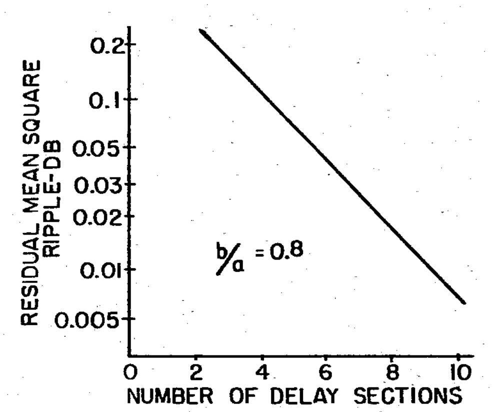
Figure 10A:
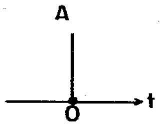
Figure 10B:
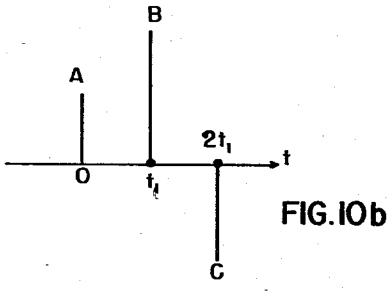
Figure 11:
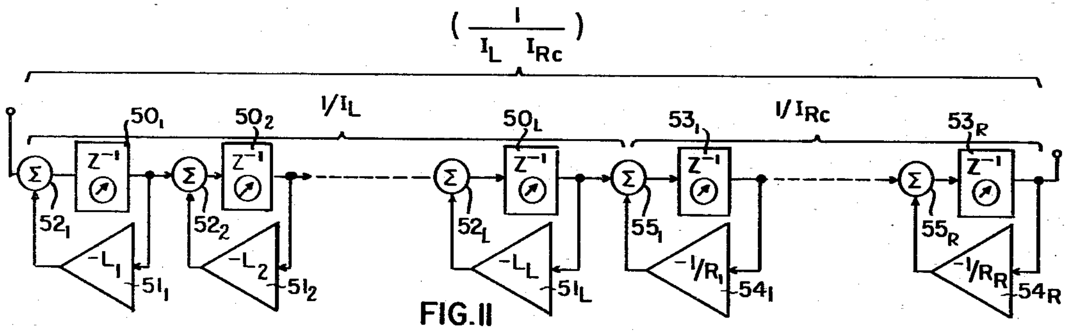
Figure 12:
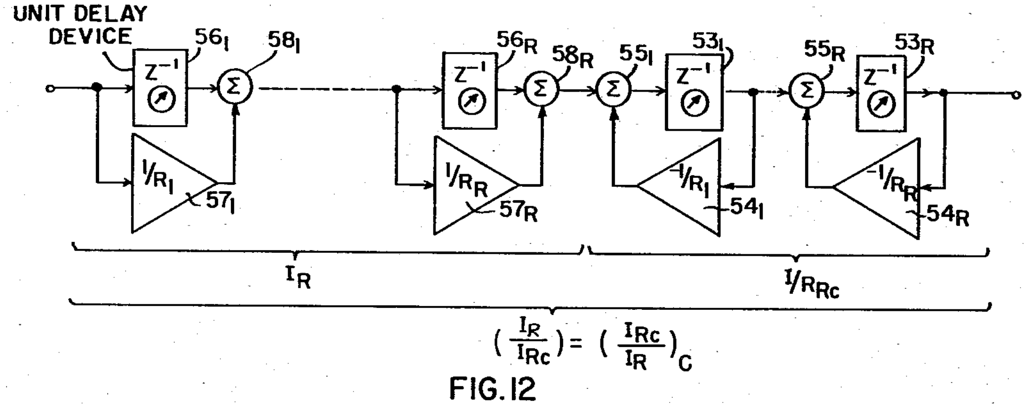
Figure 13:
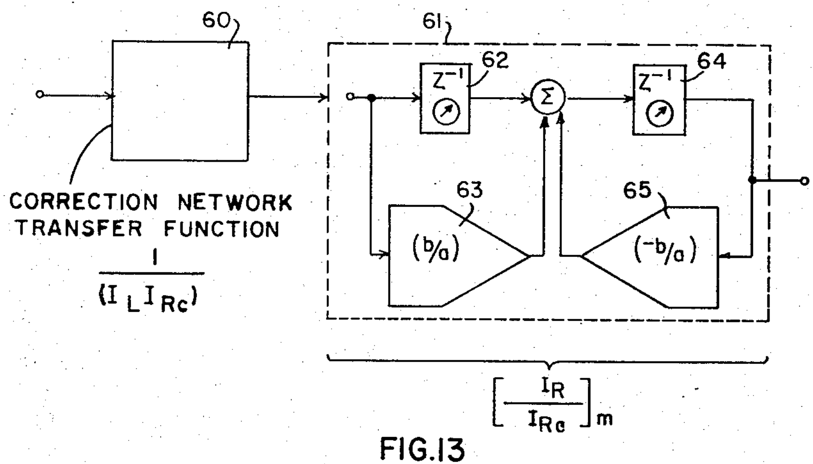
Figure 14:
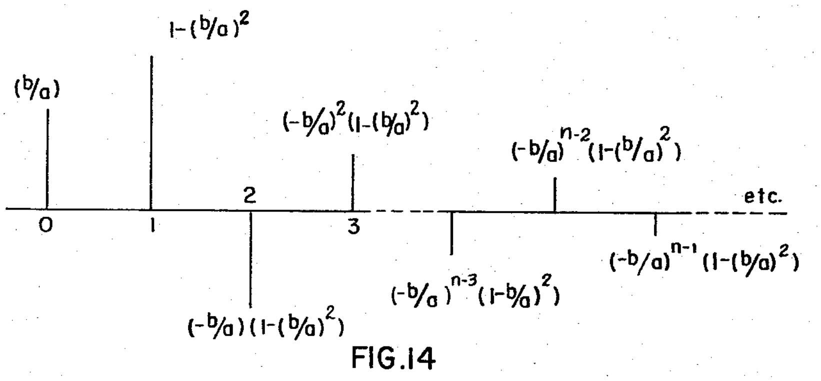
Figures 15, 16:
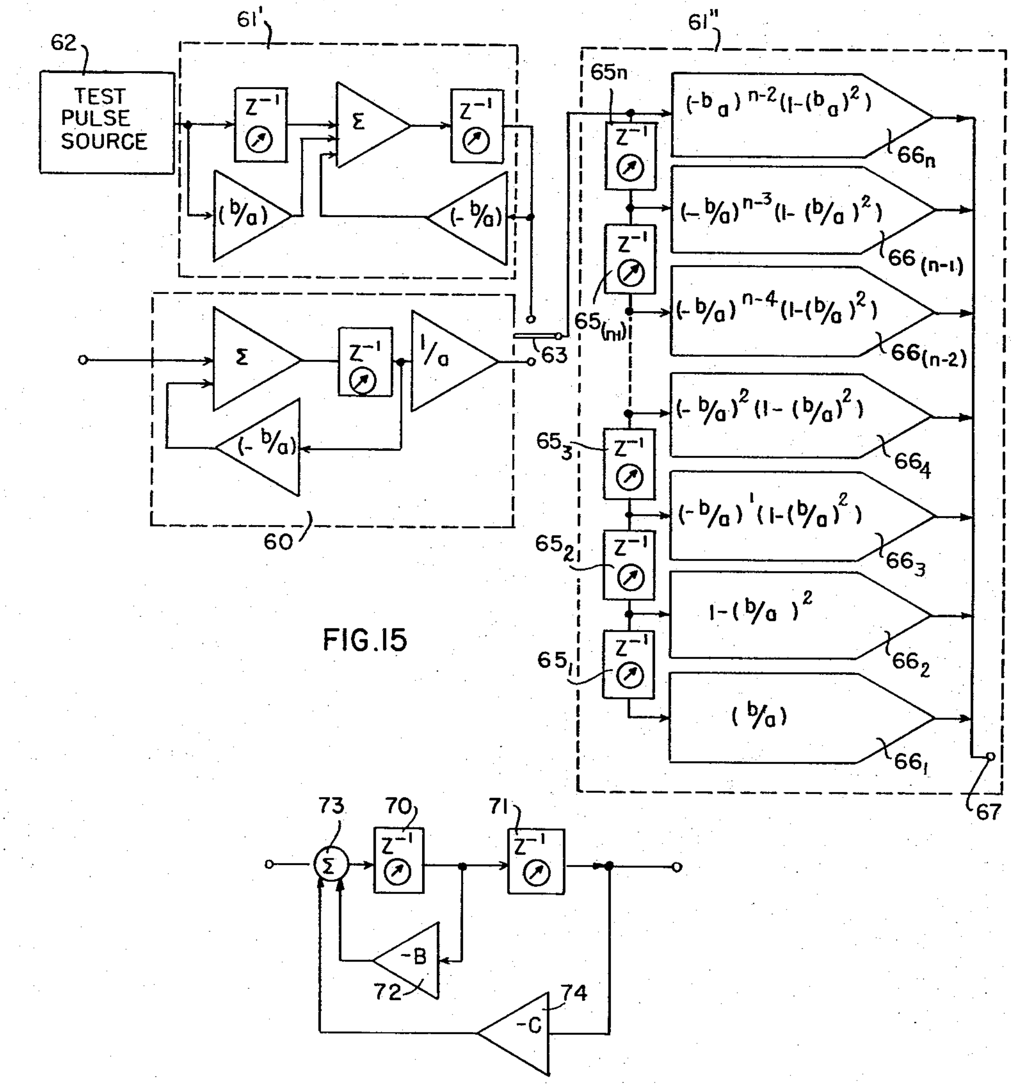
Figure 17:
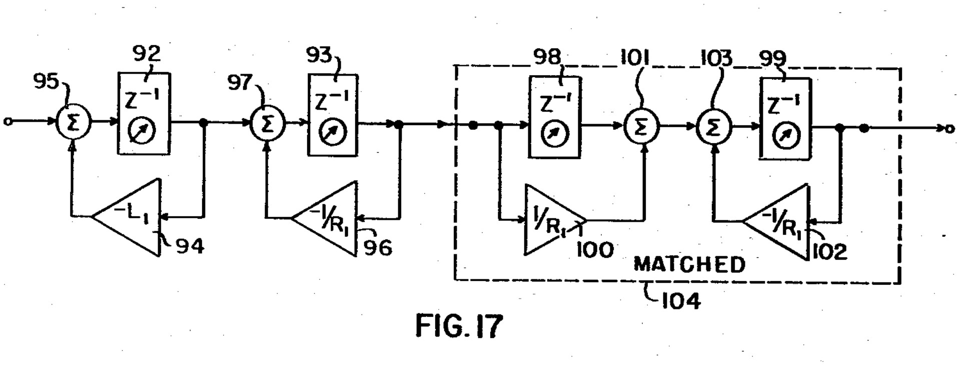
Figure 18:
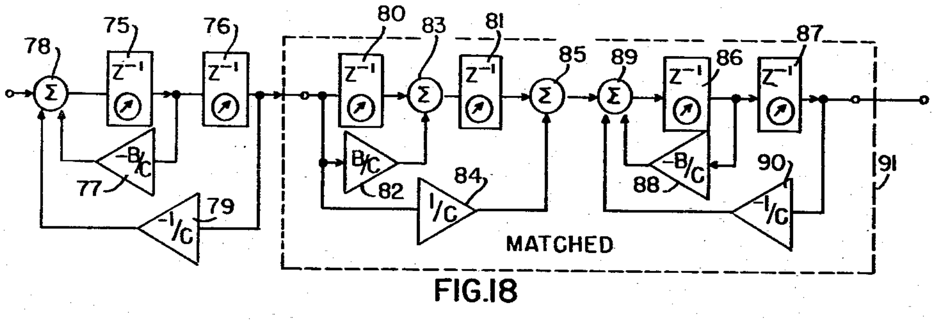
Figure 19:
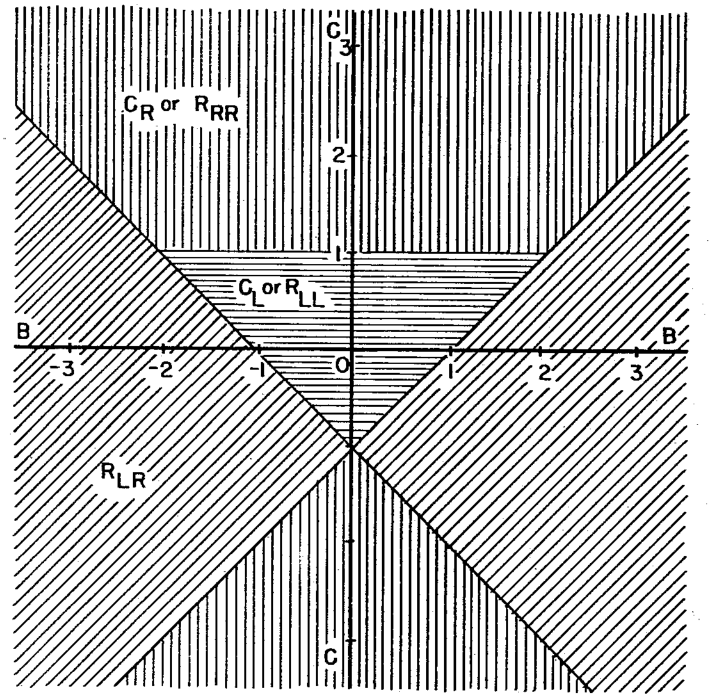
Figure 20:
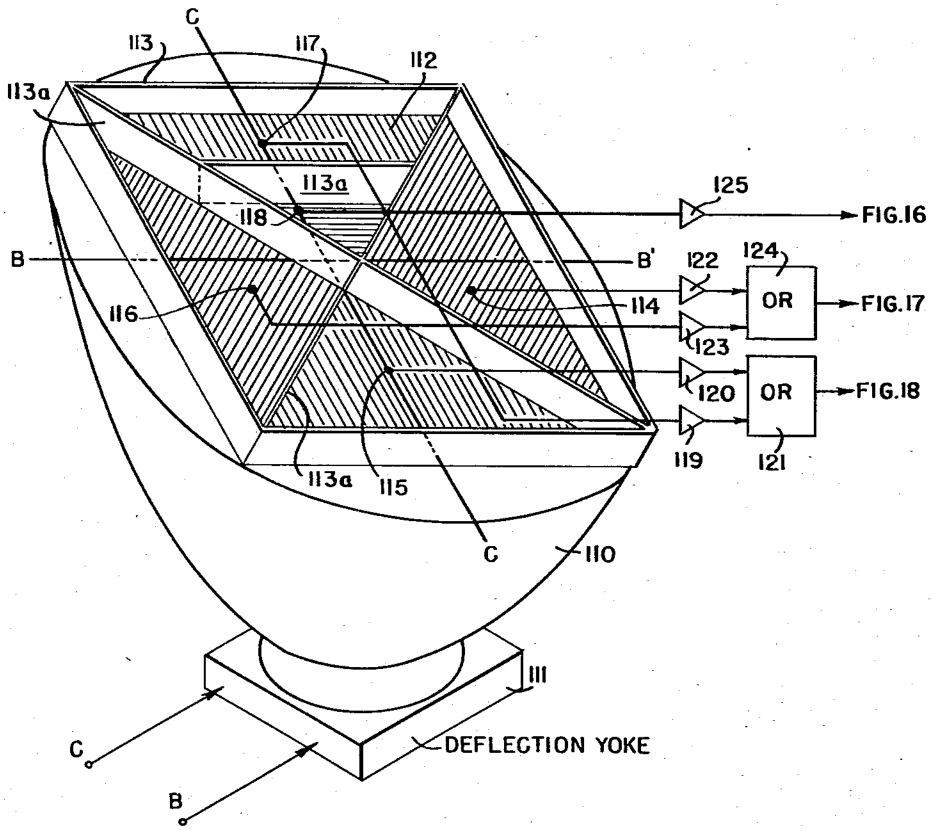

FIGS. 6a, 6b, and 6c are graphs illustrating the minimizing of residual ripple by the signal translating system of FIG. 5;

FIG. 7 is a graph showing the variations in residual ripple of the system of FIG. 5 with variation of the ratio of the amplitude of the main pulse to that of the side pulse;

FIG. 8 is a graph showing the variation in residual ripple of the system of FIG. 5 with variations in the number of delay sections in the delay line included therein;

FIGS. 9a–9g, inclusive, are graphs illustrating the reduction in residual ripple in the output of the system of FIG. 5 with increase in the number of delay sections in the delay line thereof;

FIGS. 10a and 10b are graphs representing the distortion of a delta-function impulse (FIG. 10a) by translation over a triple multipath;

FIGS. 11, 12, and 13 are schematic diagrams of networks suitable for correcting any multipath type of distortion such as, for example, the dual multipath of FIG. 2 and the triple multipath of FIGS. 10a and 10b;

FIG. 14 is a graph of the impulse response of one component of the circuit of FIG. 13;

FIG. 15 is a schematic block diagram of a distortion correcting network utilizing the configuration of FIG. 13 for dual multipath correction when the amplitude of the leading pulse is less than that of the trailing pulse such as in FIG. 2c, utilizing the configuration of FIG. 3d when the amplitude of the leading pulse is greater than that of any of the trailing pulses;

FIGS. 16, 17, and 18 are schematic block diagrams of distortion correction networks for the specific case of triple multipath when the transfer function of the link has zeros, all of which lie, respectively, only in the left-hand p-plane or within the unit circle of the z-plane (FIG. 16), when all the zeros are real (FIG. 17), and when all the zeros lie in the right-hand p-plane or outside the unit circle of the z-plane (FIG. 18);

FIG. 19 is a chart illustrating the principles of operation of FIGS. 16, 17, and 18, while FIG. 20 is a schematic diagram of an apparatus for utilizing the characteristics of the chart of FIG. 19.

As pointed out above, the present invention represents an improvement on the distortion correcting networks described and claimed in applicant's copending applications Ser. Nos. 180,456, now Patent 3,206,687, and 201,148, now Patent 3,206,688, and the correcting networks herein described and claimed have the advantage that they result in optimum reduction of signal multilation arising from noise and especially intersymbol interference.

Before describing the distortion correcting networks of the invention in detail, it is believed that it would be helpful to discuss the analytical basis of the invention. The implementation of the invention appears particularly attractive for a two-path high-frequency transmission, such as that involving the earth-ionosphere duct. Accordingly, this particular application of the invention will be considered first, in contradistinction to more general systems for the correction of dispersion in wire, radio, underwater, etc. transmissions.

Figure 1:
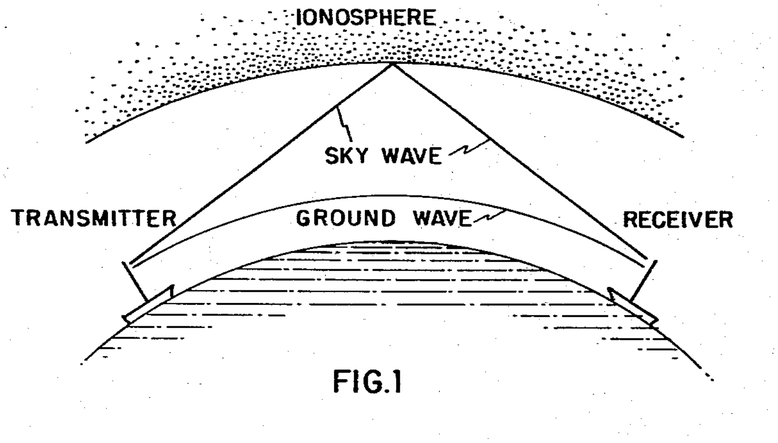

FIG. 1 of the drawings is quite self-explanatory, illustrating two transmission paths between a transmitter and a receiver, the two paths being via the ground wave and the sky wave reflected from the ionosphere. Assume that a burst or short pulse of carrier frequency signal $a_0$, of a duration of a fraction of a millisecond for example, as represented at the left of FIG. 2a, is being sent out by the transmitter of FIG. 1. Due to the multipath transmission channel, it is received at the receiver as two carrier pulses, a main or leading pulse $b$ and a lagging ghost or side pulse $a$. The carrier frequency is shown at an exaggerated low-frequency for the purpose of clarity. For convenience, the reference letters $a$, $b$, etc. are used in the following analysis to denote both the pulses themselves and their respective amplitudes. In this analysis, it is assumed that the transfer function of the dispersive channel is such as to produce, in response to an input delta-function pulse, an output comprising a main pulse and one or more side pulses displaced from the main pulse by multiples of a given time interval.

If the carrier pulses of FIG. 2a are detected or demodulated down to baseband by a linear demodulator, the wave forms are those represented in FIG. 2b. It is to be noted that the transmission time delay is neglected since it is not relevant to the communication problem under discussion. Under the conditions represented in FIG. 2b, the main or leading pulse is of greater value than the side or lagging pulse, the latter of which may be of either positive or negative polarity and is shown as of negative polarity.

Due to the time variable nature of the transmission paths of the system of FIG. 1, at some later period of time, for example of the order of a fraction of a second, conditions may have changed so that the amplitude of the main wave $b$ is less than that of the side pulse $a$ while the latter is of the same polarity as the main pulse $b$, as represented in FIG. 2c.

In what follows, idealized delta-function signals, that is, signals of indicated areas, are assumed for ease of explanation. The term "delta function," sometimes termed "unit impulse function," is defined ideally as a rectangular wave form of height A and base $b$ such that $A \cdot b$ always equals 1 as $b$ approaches zero and correspondingly A approaches infinity. This definition of delta function is found in the textbook "Statistical Theory of Communication" by Y. W. Lee, John Wiley & Sons, 1960, page 323, and in the textbook "The Fourier Integral And Its Applications" by Athanasios Papoulis, McGraw-Hill, 1962, pages 269–270, 279. Accordingly, FIG. 3a represents a baseband signal received over a dual path, similar to FIG. 2b but with the delayed side pulse of the same polarity as the leading pulse. If the distorted signal represented by FIG. 3a is fed into a correcting network having an impulse response as represented by FIG. 3b, perfect correction, that is, complete elimination of the side pulse $a$, can be effected, as shown in FIG. 3c. Such a network has heretofore been proposed and is represented schematically in FIG. 3d. This correcting network comprises an input terminal 10, a summation amplifier 11, and an output terminal 12. The amplifier 11 also feeds a delay network 13 having a time delay adjustable, as by a mechanism 14, to equal the time separation between the pulses $a$ and $b$. The time-delay network 13 has an impulse response $z^{-1}$, the significance of which will be explained hereinafter. The time-delay unit 13 is terminated in its characteristic impedance $Z_0$, as indicated. The system includes a feedback amplifier 15 having a gain of $-a/b$. The network of FIG. 3d is sometimes referred to as a comb filter, inasmuch as its amplitude-frequency response resembles the thin equi-spaced teeth of a comb. It has previously been shown that the network of FIG. 3d will, in fact, correct for the distortion of the input signal represented in FIG. 3a.

However, the correcting network of FIG. 3d is not capable of effecting correction for the multipath case represented in FIG. 2c for the reason that the feedback gain of the amplifier 15 necessarily becomes greater than unity and the network becomes unstable and, thus, unusable. The correcting networks described and claimed in applicant's aforesaid copending applications Ser. Nos. 180,456, now Patent 3,206,687, and 201,148, now Patent 3,206,688, are effective to take care of the multipath case represented by FIG. 2c but the present invention represents an improved and simplified circuit and system for effecting this correction.

In FIG. 4 is shown schematically a generalized block diagram indicating a dispersive channel 20 having an impulse response $i(t)$ comprising any type of dispersion and, in particular, that of FIGS. 2b and 2c. A correction network 21 has an impulse response $h_{cor}(t)$. The expression $m_t(t)$ represents, in FIG. 4, a random high-speed baseband data stream signal input into the transmitter.

It is to be understood, however, that the resulting design principles and formulae are equally applicable to the translation of any information-representative signals, i.e., speech, digital, or analogue information utilized to modulate the amplitude, frequency, or phase of a carrier wave.

Because of the multipath structure of transfer function $i(t)$, as represented in simplified manner in FIGS. 2b and 2c, the received data stream $m_r(t)$, being the convolution of $m_t(t)$ with $i(t)$, expressed as $m_t*i$, is received, overlapped, and smeared.

The term convolution is used in its ordinary sense to indicate an output wave form for a given input wave signal scanned by a modifying parameter. This signal $m_t*i$ is fed into a correction network 21 having a transfer function $h_{cor}(t)$, the function of which is to remove the noise and especially the overlap and wave form distortion in the received signal $m_r$ caused by the noisy multipath transmission. How well $h_{cor}$ performs its function may be judged by comparing its output $m_r*h_{cor}$ with a delayed replica of the data stream input to the transmitter $m_t(t-t_d)$, squaring the difference, and obtaining the average of the squares.

What is sought is that realizable network having an impulse response $h_{cor}(t)$ which gives the least such variance, the latter arising from both noise and ripple in its output signal.

The unit 22 is shown, for mathematically illustrative purposes, to have a transfer function of $\epsilon^{-pt}d$, where $p=j\omega$, which is that of an ideal delay line with delay $t_d$. Accordingly, its output $m_{t_d}$ is the delayed transmitted message stream $m_t(t-t_d)$. For communication uses, this delay $t_d$ is irrelevant, provided it is not too large, but it serves to assure the physical realizability of the correcting network 21. The corrected output $m_r*h_{cor}$ of the correcting network $h_{cor}$ and the ideal desired output $m_{t_d}$ are differentially added in a differential amplifier 23, the difference is squared in unit 24, and averaged in unit 25.

Other than the correcting network 21, the functions of the other blocks of FIG. 4 are solely for explanatory purposes to show how the performance of correcting network 21 is judged. In effect, by well-known mathematical methods (for example, "Extrapolation, Interpolation, and Smoothing of Stationary Time Series, with Engineering Applications" by N. Wiener, J. Wiley & Sons, 1949, and, for a more readable account, "Statistical Theory of Communication" by Y. W. Lee, John Wiley & Sons, 1960) the synthesis of the impulse transfer function $h_{cor}$ of the correcting network 21 can be forced to effect a least-squared-error from the output of unit 21. When this is done, the explicit solution is (Lee, loc. cit., page 442):

$$H_{cor}(j\omega)=\frac{1}{\phi_1}LF^{-1}(S_{m_{t_d}m_r}/\phi_2) \quad (1)$$

and $$h_{cor}(t)=F^{-1}H_{cor}(j\omega) \quad (2)$$

where L indicates the LaPlace Transform integral
$F^{-1}$ indicates the inverse Fourier Transformer integral $$S_{m_{t_d}m_r}$$

is the cross spectral density between the desired transmitted message, delayed by $t_d$, and the actual received distorted message $m_r$ Also, the functions $\phi_1$ and $\phi_2$ are defined by $$\phi_1\phi_2=S_{m_r} \quad (3)$$

The term on the right-hand side of this equation is the spectral density of the received distorted message. $\phi_1$ and $\phi_2$ are complex conjugates of each other. $\phi_1$ has zeros and poles only in the left-hand p-plane. Because $\phi_2$ is the complex conjugate of $\phi_1$, the zeros and poles of $\phi_2$ are the mirror image (the mirror being on the $j\omega$ axis) of the zeros and poles of $\phi_1$.

Foregoing Equations 1, 2, and 3 represent the complete and general mathematical solution to the problem of establishing that network $h_{cor}$, or its transform $H_{cor}$, which optimally reduces all signal multilation such as dispersion, multipath, group delay distortion, noise, and any combinations of them. A rigorous implementation of Equations 1, 2 and 3 becomes very complex for certain conditions encountered. A simplification is obtained by using the sampled data techniques used in digital control systems. The basis for this is the Sampling Theorem given in "Probability and Information Theory, with Applications to Radar" by P. M. Woodward, McGraw-Hill, 1953. This theorem states that when the baseband transmitted message stream, for example the signal input $m_t(t)$ of FIG. 4, has a finite spectrum extending from zero frequency to a cutoff frequency $f_c$ and is of zero amplitude beyond, then it is permissible to replace $m_t$ by delta functions whose magnitudes (i.e. areas) and whose epochs are, respectively, equal to the values of $m_t$ at epochs in time spaced no greater than $\frac{1}{2}f_c$. This also allows both the ionospheric impulse transfer function $i(t)$ and the impulse transfer function of the correcting network $h_{cor}(t)$ of FIG. 4 to be expressed in terms of delta-function pulses also separated by $\frac{1}{2}f_c$. In turn, this has the advantage that a correcting network having the impulse transfer function $h_{cor}(t)$ may then be synthesized as a delay line with taps spaced by $\frac{1}{2}f_c$ and with a feedback or feed-forward amplifiers at each tap of adjustable gain.

The modern mathematical language for the foregoing is the Z transform, which is simply a substitution of variables from $pt$ in the complex p-plane to $z=\epsilon^{pt}$ in the Z plane. (See "Sampled Data Control Systems" by J. R. Ragazzini et al., McGraw-Hill, 1958.) The time $t$ may then be replaced by integral multiples of the sampling epoch $\frac{1}{2}f_c$. Actually, smaller values than the latter are used to avoid time quantization error in expressing the ionospheric impulse transfer function $i(t)$. Assuming that a "unit" time cell is used, smaller than $\frac{1}{2}f_c$, then time can be expressed as an integral number $v$ of these time cells. Accordingly, the impulse transfer function of the ionosphere becomes:

$$i(t)=\sum_{v=0}^{m}a_v\delta(t-v) \quad (4)$$

where $a_v$=the magnitude (i.e. areas) of the delta-function sample of $i(t)$ at the time cell $v$.

The Z transform of this is simply $$I(z)=\sum_{v=0}^{m}a_vz^{-v} \quad (5)$$

For further illustrative simplification, assume that the transmitted message stream $m_t(t)$ is random and has a correlation function $R_{m_t}(t)$, comprising a delta function in $t$. Then the spectral density function $S_{m_t}$ of the message correlation function $R_{m_t}$ has the value $S_{m_t}=1$. Also, assume for illustrative purposes that the multilation of the received message $m_r$ by the translating channel 20 arises primarily from multipath or dispersion, rather than noise, as is primarily the case with HF radio and wire telephone data transmission. This leads to simpler expressions for the various functions of Equation 2. The spectral density of the received message $m_r(t)$ of FIG. 4 is then:

$$S_{m_r}=S_{m_t}II_c=II_c \quad (6)$$

where I(z) is given by Equation 5

$I_c(z)$=conjugate of I obtained by replacing $z$ by $1/z$ in I; $i_c(t)$, the inverse transform of $I_c(z)$, is thus the mirror image of $i$ on the time axis, that is, it is $i(t)$ backwards in time.

Moreover, the cross-spectral density between the received message stream $m_r$ and the delayed message stream $m_{td}$ with which it is to be compared is:

$$S_{m_{td}m_r} = S_{m_t} z^{-n} I_c = z^{-n} I_c \tag{7}$$

where $n$=arbitrary number of time cells of delay in the unit 22 of FIG. 4.

It will be seen that $n$ is also related to the number of time cells of delay allotted to the correction network $h_{cor}(t)$.

In accordance with a known mathematical process (loc. cit. Ragazzini et al.), I comprises in general both poles and zeros and may be factored:

$$I = I_R I_L \tag{8}$$

where $I_R$=that factor of I having zeros in the right-hand p-plane or outside of the unit circle in the Z plane and $I_L$=that factor of I having zeros and/or poles in the left-hand p-plane or within the unit circle in the Z plane.

Substituting Equation 8 in Equation 6 gives:

$$S_{m_r} = II_c = (I_L I_{Rc})(I_R I_{Lc}) \tag{9}$$

In the expression of Equation 9, the first factor $(I_L I_{Rc})$ comprises $I_L$ and $I_{Rc}$ (the conjugate of $I_R$), whose zeros are in the left-hand p-plane or within the unit circle in the Z plane, while the second factor $I_R I_{Lc}$ comprises $I_R$ and $I_{Lc}$ (the conjugate of $I_L$), whose combined zeros and poles are in the right-hand p-plane or outside the unit circle in the Z plane.

Substituting Equations 7, 8, and 9 into Equation 2 gives, finally, for the Z transform $H_{cor}$ of the correcting network yielding the least-mean-square ripple, the important new relationship:

$$H_{cor} = (1/I_L I_{Rc})(LF^{-1}(z^{-n} I_{Rc}/I_R)) \tag{10}$$

Note that the factor $(1/I_L I_{Rc})$ has its poles and/or zeros in the left-hand p-plane or within the unit circle in the z-plane, as it must in order to achieve the physically realizable networks desired for $H_{cor}$.

Equation 10 may be rewritten:

$$H_{cor} = (1/I_L I_{Rc}) \cdot (I_R/I_{Rc})_m \tag{11}$$

In words, the optimal correction network having the transfer function $H_{cor}$ is the cascade of two physically realizable and stable networks, the first of which has the transfer function $(1/I_L I_{Rc})$. The second network either is synthesized to have the transfer function $(LF^{-1} z^{-n} I_{Rc}/I_R)$ or a preferable implementation is to construct a physically realizable and stable auxiliary network having a transfer function $(I_R/I_{Rc})$ whose zeros and poles, are in the left-hand p-plane or within the unit circle. A delta-function impulse is fed into this auxiliary network and the output is used to synthesize a matching filter, as disclosed in applicant's aforesaid copending application Ser. No. 180,456, now Patent 3,206,687. This matched filter network has a transfer function represented by $(I_R/I_{Rc})_m$, representing the second factor of Equation 11. Thus, the cascade of both these physically realizable networks $(1/I_R I_{Rc})$ and $(I_R/I_{Rc})_m$ has the desired transfer function of Equation 11.

More generally, but in the same vein, the correction network for implementing Equation 2 likewise may be considered as the cascade of two physically realizable and stable networks, the first having the transfer function $1/\phi_1$ and the second network having the transfer function $$(\overline{S}_{m_{td}m_r}/\overline{\phi}_2)_m$$

where the bar above the function indicates the conjugate function obtained by replacing $p$ by $-p$. As indicated, such a network may be implemented by first constructing a physically realizable and stable auxiliary network having a transfer function $$(\overline{S}_{m_{td}m_r}/\overline{\phi}_2)$$

then feeding an impulse into this network, and using its output, or impulse response, to synthesize a matching filter, as disclosed in applicant's aforesaid copending application Ser. No. 180,456, now Patent 3,206,687. The cascade of the two physically realizable networks of transfer function $(1/\phi_1)$ and of transfer function $$(\overline{S}_{m_{td}m_r}/\overline{\phi}_2)_m$$

results in the desired correcting network specified by Equation 2.

Consider first an instructive and illuminating application of the general correction network of Equation 10 for the particular dual multipath case represented by FIGS. 2*b* and 2*c*. (The use of Equation 11 for this special case will be considered later.) The ionospheric impulse transfer function represented by Equation 5 becomes simply:

$$I = b + az^{-1} = (bz + a)/z \tag{12}$$

For this case, I has only one zero (and no pole), located at $z=(-a/b)$ in the z-plane.

Two mutually exclusive conditions are possible. When the magnitude of $a/b$ is less than unit, as represented in FIG. 2*b*, the zero of I is within the unit circle. Hence, the factors $I_R$ and $I_L$ of I become $I_R=1$, $I_{Rc}=1$, and $I_L=I=(bz+a)/z$. Accordingly, in Equation 10, the factor $(z^{-n}I_{Rc}/I_R)$ becomes simply $z^{-n}$. Also $LF^{-1}z^{-n}$ is simply $z^{-n}$. Likewise, the first factor $(1/I_L I_{Rc})$ of Equation 10 becomes $1/I_L=1/(b+az^{-1})$. Hence, for the dual multipath case assumed, the least-mean-square ripple-correcting network is that having the transfer function:

$$H_{cor} = z^{-n}/(b + az^{-1}) \tag{13}$$

In this case, physical realizability is not violated by making $n=0$ and the correcting network is, to within a constant, simply a delay line of delay equal to the delay between pulses *a* and *b* of FIG. 2*b*, with feedback gain of $(-a/b)$ as shown in FIG. 3*d*.

On the other hand, when the magnitude of $a/b$ is greater than unity, the zero of I lies outside the unit circle and the circuit of FIG. 3*d* would become unstable. However, the implementation of Equation 10 assures stable and physically realizable networks. Accordingly, $I_L=1$, $I_R=I=b+az^{-1}$, and $I_{Rc}= b+az$. For this case, Equation 10 becomes:

$$H_{cor} = (1/(b+az))LF^{-1}(z^{-n}(b+az)/(b+az^{-1})) \tag{14}$$

It appears that a physically realizable and stable network solution for this case, represented by FIG. 2*c*, in which the main pulse has an amplitude smaller than the delayed side pulse or ghost, has not heretofore been devised. However, an explanation of Equation 10, which reduces for this case to Equation 14, does yield a physically realizable and stable delay-line network having also the added important desirable property of yielding the least-mean-square residual ripple. Performing the indicated $LF^{-1}$ operation on Equation 14 gives:

$$H_{cor} = \left(\frac{1}{a(b/a+z)}\right) \cdot \left[\begin{array}{l} (1-(b/a)^2) \cdot ((-b/a)^{n-2} + \\ \qquad (-b/a)^{n-3} z^{-1} + \\ \qquad \ldots + (b/a) z^{-n+3} + \\ \qquad z^{-n+1}) \\ + (b/a) z^{-n+1} \end{array}\right] \tag{15}$$

The first factor of Equation 15, when rewritten as $(1/a)z^{-1}/(1+(bz^{-1}/a))$, shows that it can be implemented simply by one delay section with a feedback of $(-b/a)$, similar to that of FIG. 3*d*. The second factor can be implemented by an $(n-1)$ section tapped delay line with feed-forward paths of gains represented by the several coefficients. The resultant correction network is the cascade of these two networks.

In FIG. 5 there is represented a wave-signal translating system including a link subject to undesired distortion and dispersion, such as the earth-ionosphere duct. This system comprises a transmitter 30 and a dispersive channel 31, such as the earth-ionosphere duct, selectively connectable by a switch 32 to either of two channels, depending upon the relative magnitudes of the main or leading pulse *b* and the lagging or side pulse *a*. In order to determine the proper connection of the switch 32, the output of the link 31 may be connected to an oscilloscope 33 for observing the relative amplitudes of the pulses *b* and *a*. In the simple case in which *b* is greater than *a*, the switch 32 is connected to the lower channel, which is substantially a reproduction of FIG. 3*d* with additional delay line sections $34_1$, $34_2$, . . . $34_n$, each having delay adjustable to $z^{-1}$, that is, to the delay between the pulses *b* and *a* as shown on oscilloscope 33. A feedback amplifier 35 is arranged in a feedback path around the delay line section $34_1$ and feeding into a summation amplifier 36, to which the signal from the link 31 is also applied. The delay line $34_1$ . . . $34_n$ is terminated in its characteristic impedance $Z_0$ and is selectively connectable by way of amplifier 36*a* of gain $(1/b)$ to a switch 37 and then to a receiver 38.

The operation of the lower channel of FIG. 5 as described is as explained above with reference to FIGS. 3*a*, 3*b*, and 3*c* and, per se, forms no part of the present invention.

In the event that the oscilloscope 33 shows pulse *a* to be greater in magnitude than pulse *b*, the switch 32 is operated to connect the dispersive link 31 to the upper channel which comprises an implementation of Equation 15 and includes two network sections in cascade. The first section, which has a transfer function $1/(I_L I_{Rc})$, has a feedback amplifier 39 of gain $(-b/a)$ connected across the delay line section 40 having an adjustable delay $z^{-1}$. The output of the feedback amplifier 39 is connected to a summation amplifier 41 to which the dispersive transmission channel 31 is also connected through the switch 32.

Figure 5A:
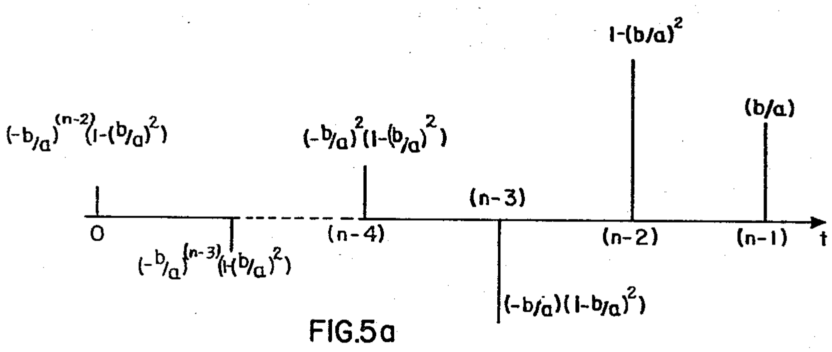
FIG. 5a is a graph representing the impulse response of the upper system of FIG. 5.

The first network just described is connected in cascade with a second network having a transfer function $$LF^{-1}(z^{-n}I_{Rc}/I_R)$$

and comprises a series of delay line sections $42_1$, $42_2$ . . . $42_{n-1}$ each having an adjustable time delay $z^{-1}$, the series being terminated in the characteristic impedance of the line $Z_0$. Individually connected to the terminals of the sections 40, $42_1$ . . . $42_{n-1}$ is a series of feed-forward amplifiers $43_1$, $43_2$, $43_3$ . . . $43_{n-1}$. The amplifiers $43_1$ . . . $43_{n-1}$ have gains represented by the coefficients of the second factor of Equation 15 and have their output circuits connected in common to the input of an amplifier 44 having a gain $1-(-b/a)^2$. A final amplifier 45, having a gain $b/a$, has its output circuit connected in common to the output circuit of the amplifier 44, the common output terminal being selectively connectable by way of amplifier 36*b* of gain $(1/a)$ to the switch 37 and then to the receiver 38, under the assumed conditions that the magnitude of pulse *a* is greater than that of pulse *b*. The impulse transfer function of the second network of the upper channel of FIG. 5, represented by the second factor of Equation 15, is shown in FIG. 5*a*.

If it be assumed, for example, that $b=0.8a$ as shown in FIG. 6*b*, there is represented in FIG. 6*a* the impulse transfer function of the upper channel of FIG. 5 represented by Equation 15. The convolution $i*h_{cor}$ of the signal represented by FIG. 6*b*, being the impulse transfer function *i* of the dual multipath transmission channel and the correction network $h_{cor}$ of FIG. 6*a*, is represented in FIG. 6*c*. This latter figure shows the performance of the least-mean-square ripple network and indicates that the side or ghost pulse *b* has been reduced in amplitude substantially relative to the main pulse *a*. That is, the optimum correction network $H_{cor}$ of FIG. 5 implements Equation 10 and yields an output $IH_{cor}$ which is characterized by a unit amplitude main pulse. It also reduces the residual ripple pulses such that they have the least-mean-square average ripple value.

FIG. 7 is a plot of the least residual mean-square ripple in db with respect to the main pulse for $n=3$ and for various values of the ratio $b/a$ for the upper channel of FIG. 5 while FIG. 8 represents the variation of the residual mean-square ripple with respect to the number *n* of delay sections in the network of the upper channel of FIG. 5 for $b/a=0.8$. It is seen that the db magnitude of the residual mean-square ripple varies inversely with the number *n* of delay sections.

Figure 9A:
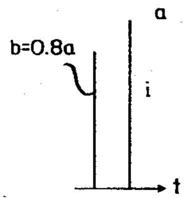
Figure 9B:
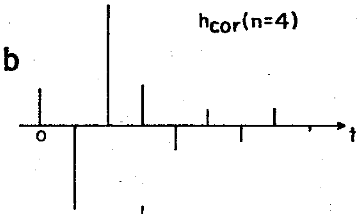
Figure 9C:
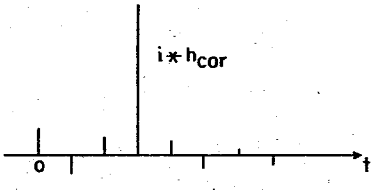
Figure 9D:
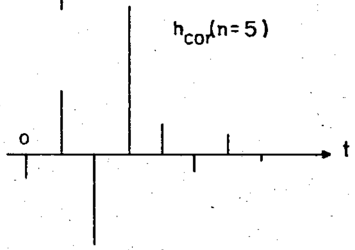
Figure 9E:
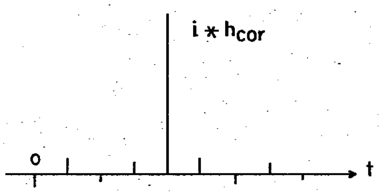
Figure 9F:
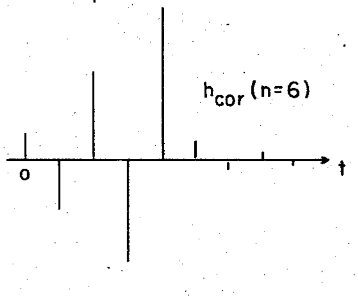
Figure 9G:
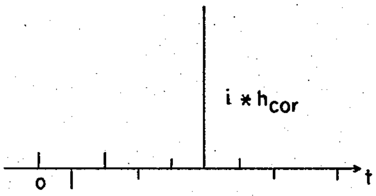

FIGS. 9*a*–9*g*, inclusive, illustrate the operation of the upper channel of FIG. 5, assuming a ratio $b/a=0.8$, as represented in FIG. 9*a*, for various numbers *n* of delay sections. FIG. 9*b* represents the impulse transfer function $h_{cor}$ of the upper channel of FIG. 5 for four delay sections while FIG. 9*c* illustrates the convolution of FIGS. 9*a* and 9*b*, $i*h_{cor}$, showing the marked reduction in residual ripple. FIG. 9*d* shows the corresponding impulse transfer function $h_{cor}$ for a correction network of five delay sections while FIG. 9*e* shows the corresponding reduction in residual ripple. FIGS. 9*f* and 9*g* show corresponding characteristics for a network of six delay sections. Corresponding with FIG. 8, FIGS. 9*a*–9*g*, inclusive, show the marked reduction in ripple in the output wave form of the correction network as the number *n* of delay line sections is increased.

There has been considered, so far, the use of Equation 10 for synthesizing the correction network needed for the special case of a dual multipath transmission channel between the transmitter and receiver. Another special case for which the correction networks will be developed is that of triple multipaths comprising three pulses of equal time separations and of any polarity. This condition is represented by FIGS. 10*a* and 10*b* in which the response of a triple multipath link to a transmitted delta-function pulse A of FIG. 10*a* is represented by FIG. 10*b* consisting of three pulses A, B, and C of equal contiguous spacing $t_1$ and of any polarity and magnitude. The transfer function for the multipath condition of FIG. 10*b* is represented by:

$$I=A+Bz^{-1}+Cz^{-2} \quad (16)$$

where the coefficients A, B, and C have any magnitudes and polarities. This is a special case of Equation 5 in which $m=2$.

Consider now the use of Equation 11 first, in general, for any multipath condition specified by Equation 5, and thus having only zeros and no poles (for simplifying illustration), and then in particular for the dual multipath case of Equation 12 and then the triple multipath case of Equation 16.

The first factor of Equation 11 is the cascade of the two factors:

$$(1/I_L I_{Rc})=(1/I_L)(1/I_{Rc}) \quad (17)$$

In this, the first factor $(1/I_L)$ converts the left-hand p-plane zeros of $I_L$ into poles of $(1/I_L)$ which are capable of physical realization. On the other hand, the right-hand p-plane zeros of $I_R$ are converted into image left-hand zeros in the conjugate function $I_{Rc}$. The conjugate function $I_{Rc}$ is obtained by replacing *z* by $1/z$ in $I_R$. Accordingly, the second factor $(1/I_{Rc})$ of Equation 17 has its poles in the left-hand p-plane, which is the needed condition for physical realizability. Thus a correcting network having the over-all transfer function of Equation 17 is physically realizable.

$I_L$ may be written as:

$$I_L=(1+L_1z^{-1})(1+L_2z^{-1}) \ . \ . \ . \ (1+L_Lz^{-1}) \quad (18)$$

where the zeros of $I_L$ are at $-L_1$, $-L_2$ . . . $-L_L$. When some of the zeros are complex, they occur in conjugate pairs. The zeros of $I_L$ are in the left-hand p-plane or within the unit circle in the z-plane when the magnitudes of all the coefficients $L_1, L_2 \ldots L_L$ are less than unity.

The first factor of Equation 17 can thus be written as:

$$(1/I_L)=\frac{1}{(1+L_1z^{-1})}\cdot\frac{1}{(1+L_2z^{-1})}\cdots\frac{1}{(1+L_Lz^{-1})} \quad (19)$$

It has been shown above that the network required for each factor of Equation 19 is a comb filter comprising a delay line of delay $z^{-1}$ with a negative feedback of gain indicated by its value of L. Thus, Equation 19 can be implemented by a cascade of such comb filters. Such a cascade group is shown within the bracket $(1/I_L)$ of FIG. 11, comprising a plurality of delay line sections $\mathbf{50}_1$, $\mathbf{50}_2 \ldots \mathbf{50}_L$, each having a time delay adjustable to $z^{-1}$. Across the delay line sections are connected feedback amplifiers $\mathbf{51}_1$, $\mathbf{51}_2 \ldots \mathbf{51}_L$ having gains of $-L_1$, $-L_2 \ldots -L_L$, each of these amplifiers feeding to the input of its respective delay line section through respective summation unit-gain amplifiers $\mathbf{52}_1$, $\mathbf{52}_2 \ldots \mathbf{52}_L$. Since each of the coefficients $L_1, L_2 \ldots L_L$ is of magnitude less than unity, this network is stable, a condition which is assured because the zeros L all are within the unit circle in the z-plane.

The network for the second factor $(1/I_{Rc})$ of Equation 17 is found in a similar manner. The factor $I_R$ can be written:

$$I_R=(1+(z/R_1))\cdot(1+(z/R_2))\ldots(L+(z/R_R))z^{-R} \quad (20)$$

where the zeros of $I_R$ are at $-R_1, -R_2 \ldots -R_R$. These zeros are in the right-hand p-plane outside the unit circle in the z-plane, and all the coefficients $R_1, R_2 \ldots R_R$ are of magnitude larger than unity. Accordingly, the second factor of Equation 17 is:

$$(1/I_{Rc})=\frac{z^{-1}}{(1+(z^{-1}/R_1))}\cdot\frac{z^{-1}}{(1+(z^{-1}/R_2))}\cdots\frac{z^{-1}}{(1+(z^{-1}/R_R))} \quad (21)$$

Similarly, Equation 21 can be implemented by a cascade of comb filters, such as the cascade group shown within the bracket $(1/I_{Rc})$ of FIG. 11, comprising the delay line sections $\mathbf{53}_1 \ldots \mathbf{53}_R$, each feeding back to the input of its respective delay line section through one of the unity-gain summation amplifiers $\mathbf{55}_1 \ldots \mathbf{55}_R$. Again, because all of the coefficients $R_1, R_2 \ldots R_R$ are outside of the unit circle in the z-plane and their reciprocals are within such unit circle, the network is stable.

As shown in FIG. 11, the two networks representative of the factors $(1/I_L)$ and $(1/I_{Rc})$ are connected in cascade and constitute an implementation of Equation 17 representing the first factor of both Equation 10 and of Equation 11.

Consider now the second factor of Equation 10 and Equation 11. That of Equation 10 is $LF^{-1}z^{-n}(I_{Rc})(1/I_R)$. In this term, the symbol $LF^{-1}$ means "the LaPlace transform of the inverse Fourier transform of." The factor $(1/I_R)$ has poles in the right-hand p-plane because the factor $I_R$ has zeros in the right-hand p-plane. The transfer function $(1/I_R)$ is thus not physically realizable. This is not cured by multiplication by the delay factor $z^{-n}$ with finite value of $n$ because its Fourier transform $F^{-1}z^{-n}(1/I_R)$ has finite response before the time $t=0$. The factor $I_{Rc}$ is not troublesome and is realizable, inasmuch as it has no poles but only zeros which can be located anywhere. The process of taking the LaPlace transform of this term cuts off that part of this response which is prior to $t=0$ and, in so doing, assures realizability of a network which gives improved ripple reduction as the number $n$ of delay line sections is increased.

The implementation of the second factor of Equation 10, as represented by the second factor of Equation 11, is based on the recognition of two simple facts. The first fact is that if one takes the conjugate of the troublesome factor $(1/I_R)$, denoted by $(1/I_{Rc})$, then the latter is physically realizable because it may then be represented by Equation 21 and may be implemented by the final cascaded network of FIG. 11. Moreover, the conjugate of the complete factor $(I_{Rc}/I_R)$ of Equation 10, expressed as $(I_R/I_{Rc})$, likewise is physically realizable, having the form:

$$(I_R/I_{Rc})=I_R(1/I_{Rc})=\frac{(1+(z/R_1))}{(1+(z^{-1}/R_1))}\cdots\frac{(1+(z/R_R))}{(1+(z^{-1}/R_R))}z^{-2R} \quad (22)$$

This has zeros at $-R_1, -R_2 \ldots R_R$ outside the unit circle in the z-plane and corresponding image poles at $-1/R_1, -1/R_2 \ldots -1/R_R$ within the unit circle.

The implementation of Equation 22 is shown in FIG. 12 and comprises two networks in cascade. The first, implementing the factor $I_R$, consists of a series of delay line sections $\mathbf{56}_1 \ldots \mathbf{56}_R$, each having a delay adjustable to the value $z^{-1}$, provided with feed-forward amplifiers $\mathbf{57}_1 \ldots \mathbf{57}_R$ having gains of $1/R_1 \ldots 1/R_R$ and feeding into unity-gain summation amplifiers $\mathbf{58}_1 \ldots \mathbf{58}_R$ connected to the output circuits of the respective delay line sections $\mathbf{56}_1 \ldots \mathbf{56}_R$. The second network of FIG. 12, representing the factor $(1/R_{Rc})$ of Equation 22, is a duplicate of the right-hand network of FIG. 11, the elements being identified by corresponding reference numerals. The over-all transfer characteristic of the two networks in cascade constitutes an implementation of the second factor $(I_R/I_{Rc})$ of Equation 22.

The second fact upon which the disclosed implementation of the second factor of Equation 10 rests is the observation that the impulse transfer function of the desired factor is the time-backwards impulse transfer function of the physically realizable implementation of FIG. 12 of Equation 22. A method for implementation of such time-backwards transfer functions involves the use of a correcting network of the type described and claimed in applicant's aforesaid copending application Ser. No. 180,456, now Patent 3,206,687, which, for brevity, may be referred to simply as a matched filter.

Equation 10 has accordingly been rewritten, symbolically as Equation 11, becoming $H_{cor}=(1/I_LI_{Rc})\cdot(I_R/I_{Rc})_m$. In this, the notation $(I_R/I_{Rc})_m$ is shorthand for the following process: (1) Form the auxiliary physically realizable network $I_R/I_{Rc}$ in the manner indicated in FIG. 12; (2) then impress an impulse on this auxiliary network and feed its resulting output into an adjustable matched filter comprising a pre-assigned number of delay line sections each of delay $z^{-1}$; (3) the matched filter so formed, denoted by $(I_R/I_{Rc})_m$, represents a network whose transfer function can be made as close to the ideal transfer function $LF^{-1}(z^{-n}I_{Rc}/I_R)$ as one is willing to use an increasing number of delay sections. This is still another way of indicating, as observed in FIG. 8, that the correcting networks herein disclosed approach perfect multipath correction as they comprise the use of an increasing number of delay sections.

Consider now, for illustrative purposes, the application of the general Equation 11, in which I has both poles and zeros, to the specific cases of both dual and triple multipath, in which I has, respectively, one and two zeros (and no poles). The dual multipath case is illustrated in FIGS. 1 and 2 and its transfer function is specified by Equation 12 as $I=b+az^{-1}$. The only zero of this is located at $z=-a/b$ in the z-plane. For the case when the magnitude of $(a/b)$ is less than unity, for which, in the notation of Equation 19, $I_R=1$ and $$I=I_L=b(1+(a/b)z^{-1})$$

and $L_1=a/b$, the correction network is shown by the first network section of FIG. 11, which is the same as that of FIG. 3*d*. It is recalled that the notation $z^{-1}$ is herein used to denote the delay between pulses *a* and *b* of FIG. 2 and is shown in FIG. 3*d* to be manually adjustable. Adjustment in FIG. 3*d* of this delay simply comprises use in FIG. 3*d* of a tapped delay line whose taps are spaced not greater than the reciprocal of twice the baseband width, impressing the signal of FIG. 2 upon the network until the leading pulse *b* arrives at the input of the network, allowing the leading pulse *b* to proceed along this network and, at the instant the next pulse *a* arrives at the input, then, at the delay tap where the pulse *b* finds itself at that instant, an amplifier is used with a gain $-(a/b)$ and feeding back to the input, as shown in FIG. 3*d*.

On the other hand, when the magnitude of $(a/b)$ is greater than unity, then $I_L=1$, $I_R=b+az^{-1}=az^{-1}(1+(z/(a/b)))$, using the notation of Equation 20. The zero of I, or $I_R$, is now at $-R_1=-(a/b)$, which is outside the unit circle. Accordingly, the first factor $(1/I_LI_{Rc})$ of Equation 11 may be implemented by the second cascade network of FIG. 11 is which feedback amplifier $\mathbf{54}_1$ has the gain $-(1/R_1)=-(b/a)$ which is of magnitude less than unity and thus, as expected, assures a stable and physically realizable network. The latter is represented in FIG. 13 by unit 60.

For this dual multipath case, the implementation of the second factor $(I_R/I_{Rc})_m$ of Equation 11 may be effected, as described above, by first forming an auxiliary network of transfer function $(I_R/I_{Rc})$, as shown in FIG. 12. This is the network contained in the unit 61 of FIG. 13 and comprises the cascade of a delay line unit 62 of unit delay having a feed-forward amplifier 63 of a gain of $(1/R_1)=(b/a)$, corresponding to amplifier $\mathbf{57}_1$ of FIG. 12, in cascade with a delay line unit 64 or unit delay shunted by a feedback amplifier 65 with a gain $-b/a$, corresponding to amplifier $\mathbf{54}_1$ of FIG. 12. The impulse transfer function of this auxiliary network is shown in FIG. 14. It is noted that, as expected, this transfer function is the same as that shown in FIG. 5*a* except that it is reversed with respect to time and also with the exception that the series of side pulses of FIG. 14 continue indefinitely. What is now required, and is provided by the factor $(I_R/I_{Rc})_m$ of Equation 11, is a network with an impulse transfer function which is that of FIG. 14 but reversed with respect to time and, obviously, also with a finite cutoff point to avoid the physically unrealizable condition of a finite response prior to zero time.

As described in applicant's aforesaid application Ser. No. 180,456, now Patent 3,206,687, such a time-backwards impulse transfer function can be obtained by means of a matched filter, that is, a filter comprising a tapped delay line with adjustable gain and feed-forward amplifiers individually connected to the line taps and having their polarities and/or gains set in accordance with the instantaneous voltages appearing at the respective taps in response to the distribution of the wave form of the impulse transfer function of the auxiliary network $(I_R/I_{Rc})$ along the delay line, the outputs of tne individual amplifiers being summed to provide the network output.

In FIG. 15 is shown one system for effecting this alternate implementation of Equation 10 as given by Equation 11. A test pulse source 62 for providing a delta-function impulse is connected to an auxiliary network unt 61′ having an impulse transfer function $(I_R/I_{Rc})$, the output of the latter being selectively connected by a switch 63 to a matched filter unit 61″ so as to become a network having the impulse transfer function $(I_R/I_{Rc})_m$ of Equation 11. This matched filter network embodies the basic principles of FIG. 4 of aforesaid application Ser. No. 180,456, now Patent 3,206,687, extended, however, to respond not only to the polarities of the instantaneous voltages of a test pulse distributed along the delay line but also to the amplitudes of those voltages, it being assumed that the gains and polarities of the several amplifiers are adjusted manually to the values indicated in response to a visual observation of the relationship of the leading and side pulses of the test signal translated by the unit 61′ and that a zero gain setting is used for each of the tap amplifiers of the matched filter in which zero signal amplitude appears, such as between pulses in FIG. 14. It is also assumed that either the delay times of the several delay line sections are adjusted manually to the time separation of adjacent leading and side pulses of the test signal as translated by the unit 61′ or that the delay of each delay line section is not greater than the reciprocal of twice the basehand width.

In brief, the matched filter unit 61″ comprises a series of delay line sections $\mathbf{65}_1$, $\mathbf{65}_2$ . . . $\mathbf{65}_n$ which, for one implementation, has a series of delay taps each adjustable to have a time delay $z^{-1}$ equal to the time separation of the received main pulse and the adjacent side pulse. Connected to the junction points of the delay line sections $\mathbf{65}_1$, $\mathbf{65}_2$ . . . $\mathbf{65}_n$ are a series of feed-forward amplifiers $\mathbf{66}_1$, $\mathbf{66}_2$ . . . $\mathbf{66}_n$. When the wave form of FIG. 14 from unit 61′ appears on this network 61″, the feed-forward amplifier at each junction point has its respective gain and polarity set to correspond to the coefficient of the respective pulse of the impulse transfer function shown in FIG. 14. The amplifiers $\mathbf{66}_1$, $\mathbf{66}_2$ . . . $\mathbf{66}_n$ are connected to a common output terminal 67 either directly or through isolation amplifiers, as required.

In the operation of the system of FIG. 15, upon receipt of a signal over a dual multipath having the impulse transfer function of FIG. 2*c*, with the leading pulse *b* smaller in magnitude than the trailing pulse *a*, networks 60 and 61′ are at first formed. Then a test impulse is obtained from source 62 to supply a delta-function impulse to the unit 61′ whose output is shown in FIG. 14. The switch 63 is operated to connect the output of unit 61′ to the unit 61″. Each of the delay line sections $\mathbf{65}_1$ . . . $\mathbf{65}_n$ is adjusted to have a time delay $z^{-1}$ equal to the time spacing between the received main test pulse and the adjacent side pulse and each of the amplifiers $\mathbf{66}_1$ . . . $\mathbf{66}_n$ is adjusted to have a gain and a polarity of value equal to the instantaneous voltage appearing at its respective tap at a given instant of time when a received wave form of FIG. 14 is distributed along the delay line, as explained in aforesaid application Ser. No. 180,456, now Patent 3,206,687. When so formed, the unit 61″ will have an impulse transfer function represented by FIG. 14 but reversed with respect to time, as represented in FIG. 5*a*. The switch 63 is then operated to disconnect the unit 61′ from the unit 61″ and to connect the unit 60 thereto so that the signal of FIG. 2*c*, received at the input of the unit 60, is translated by it and applied to the unit 61″. The resultant output signal of the unit 61″, appearing at terminal 67, will then be similar to that represented by one of FIGS. 9*c*, 9*e*, and 9*g*, etc., depending upon the number of filter sections included in the unit 61″.

An alternate operation of the matched filter unit 61″ is to arrange the delay per section to be not larger than the reciprocal of twice the baseband width of the transmission channel, then to set the gain of the amplifier at each tap to a value equal to the magnitude of the respective one of the pulses of FIG. 14 at the corresponding delay, and then to set to zero gain the amplifiers for delay taps intervening between the pulses of FIG. 14. The same desired time-backward impulse transfer function of FIG. 5*a* is thus obtained.

A case of triple multipath is represented in FIGS. 10*a*, 10*b* in which the transmitted signal A is received as a first (ground wave) baseband pulse of amplitude A, followed by a second (sky wave) pulse of any amplitude and polarity B, and a third (sky wave) pulse of any amplitude C and polarity, for example of opposite polarity to pulses A and B, as shown.

The impulse transfer function of this triple multipath is represented by Equation 16 which may be simplified by assuming that pulse A has a normalized unity value so that $B/A$ becomes B while $C/A$ becomes C and the impulse transfer function becomes simply:

$$I=1+Bz^{-1}+Cz^{-2} \quad (23)$$

The two zeros of the transfer function I of the ionosphere for this case are at $$(-B/2)+\sqrt{(B/2)^2-C} \quad (24)$$

and $$(-B/2)-\sqrt{(B/2)^2-C}$$

It can be seen that, depending on the relative magnitudes and polarities of B and C, the zeros in the z-plane can both be real and, if real, can both be either outside the unit circle or one zero within and the other zero outside the unit circle. The zeros can also both be complex and, if so, they occur as a conjugate pair with magnitudes which can both be either within or outside the unit circle. If B and C are considered to be the rectangular coordinates of a plane then, as represented in FIG. 19, these five mutually exclusive conditions outline five regions of the B–C plane which, as will be shown, result in three different correcting network implementations of Equation 11 as derived from FIGS. 11, 12, and 13, depending on the relative values and polarities of A, B, and C in FIG. 10*b*. These regions, with corresponding network configurations, are:

The network of FIG. 16 (described hereinafter) is required for the conditions designated as:

$R_{LL}$—meaning that both zeros of I are real and both lie in the left-hand p-plane or within the unit circle in the z-plane $C_L$—meaning that both zeros are complex and lie in the left-hand p-plane or within the unit circle.

The network of FIG. 17 (described hereinafter) is required for the condition designated as:

$R_{LR}$—meaning that both zeros are real and that one is within and the other outside the unit circle.

The network of FIG. 18 (described hereinafter) is required for the conditions designated as:

$R_{RR}$—meaning that both zeros are real and that both are outside the unit circle $C_R$—meaning that both zeros are complex and that both are outside the unit circle.

For the foregoing conditions specified as $R_{LL}$ and $C_L$ (see FIG. 19), the zeros of I of Equation 16 are within the unit circle in the z-plane and, accordingly, $I=I_L$ while $I_R=1$ and $I_{Rc}=1$. The required correction network for this case is, from Equation 11, simply:

$$H_{cor}=1/I_L=(1/(1+L_1z^{-1}))\cdot(1/(1+L_2z^{-1})) \quad (25)$$

where the notation of Equation 19 is being used.

When the zeros $-L_1$ and $-L_2$ are both real (i.e. condition $R_{LL}$), the implementation of the required correcting network is shown as the first cascade section of the network of FIG. 11, comprising a delay line section $50_1$ with feedback amplifier $51_1$ of gain $-L_1$ in cascade with another delay line section $50_2$ with a feedback amplifier of gain $-L_2$.

An alternate implementation can be obtained by rewriting Equation 25 as:

$$H_{cor}=1/I_L=1/(1+(L_1+L_2)z^{-1}+L_1L_2z^{-2}) \quad (26)$$

and noting from Equation 24 that $L_1+L_2=B$ while $L_1L_2=C$ so that Equation 26 becomes:

$$H_{cor}=1/(1+Bz^{-1}+Cz^{-2}) \quad (27)$$

Using known procedures (for example, "Digital and Sampled-Data Control Systems" by J. T. Tou, FIG. 9.6–7, page 454), it can be shown that Equation 27 corresponds to the network of FIG. 16 which may be used for both conditions of $R_{LL}$ and $C_L$ of the zeros of I.

The network of FIG. 16 comprises a delay line including sections 70 and 71 in cascade. A negative feedback amplifier 72, having a gain −B, is connected around the delay line section 70 and its output is connected through a unity-gain summation amplifier 73 to the input of the delay line section. A second negative feedback amplifier 74, having a gain −C, is connected around both of the delay line sections 70 and 71 and feeds to the input circuit of section 70 through a unity-gain summation amplifier 73. The network of FIG. 16 uses feedback equal to the direct values of −B and −C, thus resulting in a simpler implementation than that of FIG. 11.

On the other hand, consider the case when the two zeros of I are both outside the unit circle in the z-plane and are either both real or both complex, these being, respectively, regions $R_{RR}$ and $C_R$ of FIG. 19. Then $I_L=1$ and from Equation 20, $$I=I_R=((1/R_1)+z^{-1})((1/R_2)+z^{-1})$$

where the zeros $-R_1$ and $-R_2$ are given by Equation 24. Because $1/R_1R_2=1/C$ while $(1/R_1)+(1/R_2)=B/C$, where B and C are defined in Equation 16, then it can be shown that $I_R=((1/C)+(B/C)z^{-1}+z^{-2})$ while $$1/I_{Rc}=z^{-2}/(1+(B/C)z^{-1}+(1/C)z^{-2})$$

Accordingly, the correction network of Equation 11 becomes that shown in FIG. 18. It is found likewise that, for condition $C_R$, the same network of FIG. 18 is obtained.

The system of FIG. 18 comprises two networks in cascade. The first network includes cascade delay line sections 75 and 76, a negative feedback amplifier 77 having a gain $(-B/C)$ connected around the section 75 through a unity-gain summation amplifier 78 while a second negative feedback amplifier 79 having a gain $(-1/C)$ is connected around both of the sections 75 and 76 and feeds to the input circuit of section 75 through the unity-gain summation amplifier 78. For this zero condition, a second auxiliary network 91 comprises delay line sections 80 and 81 in cascade, having a feed-forward amplifier 82 with a gain $(B/C)$ connected around the section 80 through a unity-gain summation amplifier 83 and a second feed-forward amplifier 84 with a gain $(1/C)$ around both sections 80 and 81 and feeding into the common output circuit through a unity-gain summation amplifier 85. The second portion of this auxiliary network includes cascade connected delay line sections 86 and 87, a negative feedback amplifier 88 having a gain $(-B/C)$ connected around the section 86 through a unity-gain summation amplifier 89 and a second negative feedback amplifier 90 having a gain $(-1/C)$ connected around both sections 86 and 87 through the unity-gain summation amplifier 89. The over-all auxiliary network is included within a dash-line box 91 and labeled "MATCHED" to indicate that, as described above, the network is first to be excited by an impulse (as by unit 62 of FIG. 16) and its output then fed into a matched filter having a series of tap amplifiers set as described above in connection with the unit 61'' of FIG. 15. The combination of the two cascade connected networks, as schematically shown in FIG. 18, is then the required correcting network satisfying Equation 11 for a triple multipath dispersion link.

Finally, for condition $R_{LR}$ of FIG. 19, for which the zeros of I given by Equation 24 are both real with one inside and the other outside the unit circle in the z-plane, the ionosphere transfer function may be written:

$$I=I_LI_R=(1+L_1z^{-1})((1/R_1)+z^{-1}) \quad (28)$$

using the notation of Equation 18 and Equation 20. The correction network for this case, as given by Equation 11, is shown in FIG. 17 which follows directly from the foregoing values of $L_1$ and $R_1$ and from the general networks of FIG. 11 and FIG. 12.

Here, again, the correcting system comprises two cascade connected networks, the first consisting of first delay line sections 92 and 93, a negative feedback amplifier 94 having a gain $-L_1$ connected around the section 92 through a unity-gain summation amplifier 95, satisfying Equation 19, and a second negative feedback amplifier 96 having a gain $(-1/R_1)$ connected around the section 93 through a unity-gain summation amplifier 97. The auxiliary network 104 includes delay line sections 98 and 99, a feed-forward amplifier 100 having a gain $1/R_1$ connected around the section 98 through a unity-gain summation amplifier 101, and a second feedback amplifier 102 having a gain $(-1/R_1)$ connected around section 99 through a unity-gain summation amplifier 103. The auxiliary network included within a dash-line box 104 is labeled "MATCHED" to indicate it is first to be excited by a test impulse (as by unit 62 of FIG. 16), then its output fed into a matched filter, and the ensuing matched filter connected in cascade with the network 92–97, inclusive, as described above in connection with FIGS. 13 and 15.

Implementation of the logic for the choice of the correct one of the networks of FIGS. 16, 17, and 18, as a function of the values of B and C relative to A, can be effected by applying the two-dimensional logic gate pattern of FIG. 19 to the face of a cathode-ray tube, as schematically represented in FIG. 20. In this figure is represented a cathode-ray tube 110 having a deflection yoke 111 for deflecting the cathode-ray beam in two orthogonal directions. The face of the tube, representing the B–C plane, is coated with the usual fluorescent screen. One area, represented by shading lines parallel to the C—C axis, is representative of the regions $C_R$ or $R_{RR}$; a second area, represented by shading lines parallel to the B—B axis, is representative of the $C_L$ or $R_{LL}$ regions; while a third area, represented by shading lines diagonal to both axes, is representative of the $R_{LR}$ region. As indicated, each of these three regions requires a different one of the correcting networks of FIGS. 16, 17, and 18.

The face of the cathode-ray tube 110 is covered by a light box 113 normally provided with a cover (not shown) and divided by internal light-proof partitions 113*a*, 113*a*, into a number of compartments. A plurality of photoelectric devices, for example photocells or photoconductive diodes 114, 115, 116, 117, and 118, are individually disposed in the light-proof compartments and are effective to "look at" their respective regions. The photoelectric devices are connected to logic circuitry used to switch into effective operation the proper one of the correcting networks of FIGS. 16, 17, and 18. The photoelectric devices 115 and 117 are connected through isolating amplifiers 119 and 120, respectively, to an OR logic circuit 121 effective, upon excitation of either of its input circuits, to close a circuit to the network of FIG. 18. The photoelectric devices 114 and 116 are connected through isolating amplifiers 122 and 123, respectively, to an OR logic circuit 124 effective, upon excitation of either of its input circuits, to make a connection to the network of FIG. 17. The photoelectric device 118 is connected through an isolation amplifier 125 to the correcting network of FIG. 16.

In operation, by the conjoint effect of signals applied to the deflection yoke 111 of the cathode-ray tube 110 proportional to the coefficients B and C, the cathode-ray beam will be deflected to one or another of the three regions and thus will selectively excite the photoelectric devices to connect into circuit the appropriate one of the correcting networks of FIGS. 16, 17, and 18.

By the use of the cathode-ray tube gating mechanism of FIG. 20 in connection with the correcting networks of FIGS. 16, 17, and 18, there is provided a relatively simple mechanism for automatically correcting for the special case of triple multipath dispersion and distortion which would not be feasible by any straightforward rigorous implementation of the complicated general equations defining the required impulse transfer function of the correcting network.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. In a wave-signal translating channel including a link subject to undesired noise and to signal dispersion and multipath distortion effective to convert an input delta-function signal into a dispersed wave form extending substantially beyond the reciprocal of twice the baseband width of the link, thereby giving rise to intersymbol interference in the output signal thereof, and in which the transfer function of the link has one or more zeros in the right-hand p-plane, a correction network for substantially reducing said noise and intersymbol interference comprising:

(a) an input circuit for supplying a signal translated by said link;

(b) an output circuit;

(c) and a wave-signal correction transmission line coupling said input circuit and said output circuit having a predetermined time delay and including two portions coupled in cascade, a first of said portions having a transfer function represented by the expression $(1/\phi_1)$ and the second of said portions having a transfer function corresponding to that of a filter matched to the impulse response of a network having a transfer function represented by the expression:

$$(\bar{S}_{m_{t_d}m_r}/\bar{\phi}_2)_m$$

where $$\bar{S}_{m_{t_d}m_r}=$$

the spectral density function, being the Fourier Transform of the corresponding correlation function $$R_{m_{t_d}m_r}$$

in which the argument $p=j\omega$ is replaced by $-p$ $m_{td}$=ideal desired signal output $m_r$=received signal $\phi_1$=factor function having zeros and poles only in the left-hand p-plane $\phi_2$=factor function having zeros only in the right-hand $p$-plane.

2. In a wave-signal translating channel including a link subject to undesired signal dispersion and multipath distortion effective to convert an input delta-function signal into a leading pulse $b$ and one or more trailing pulses $a$, $c$, etc., thereby giving rise to intersymbol interference in the output signal thereof, and in which the transfer function I of the link, expressed as $I=I_L I_R$, comprises a factor $I_R$ having one or more zeros in the right-hand p-plane or outside the unit circle in the z-plane and a factor $I_L$ having zeros and/or poles in the left-hand p-plane or within the unit circle in the z-plane, a correcting network for substantially reducing said intersymbol interference comprising:

(a) an input circuit for supplying a signal translated by said link;

(b) an output circuit;

(c) and a wave-signal correction transmission line coupling said input circuit and said output circuit and having a predetermined time delay and a transfer function $H_{cor}$ represented by the expression:

$$H_{cor}=(1/I_L I_{Rc})LF^{-1}(z^{-n}I_{Rc}/I_R)$$

where $I_{Rc}$=conjugate of the function $I_R$ $L$=the LaPlace Transform $F^{-1}$=the inverse Fourier Transform
$z^{-n}$=time delay of the $n$th time cell.

3. In a wave-signal translating channel including a link subject to undesired signal dispersion and multipath distortion effective to convert an input delta-function signal into a leading pulse $b$ and one or more trailing pulses $a$, $c$, etc., thereby giving rise to intersymbol interference in the output signal thereof, and in which the transfer function I of the link, expressed as $I=I_LI_R$, comprises a factor $I_R$ having one or more zeros in the right-hand p-plane or outside the unit circle in the z-plane and a factor $I_L$ having zeros and/or poles in the left-hand p-plane or within the unit circle in the z-plane, a correcting network for substantially reducing said intersymbol interference comprising:

(a) an input circuit for supplying a signal translated by said link;
(b) an output circuit;
(c) and a wave-signal correction transmission line coupling said input circuit and said output circuit having a predetermined time delay and including two portions coupled in cascade, a first of said portions having a transfer function represented by the expression $(1/I_LI_{Rc})$ and the second of said portions having a transfer function corresponding to that of a filter matched to the impulse response of a network having a transfer function represented by the expression $(I_R/I_{Rc})_m$, where the subscript $c$ indicates the conjugate function obtained by replacement of $z$ by $1/z$ and where $z$=reciprocal of time delay of unit time cell.

4. In a wave-signal translating channel including a link subject to undesired signal dispersion and multipath distortion effective to convert an input delta-function into a leading pulse $b$ and a trailing pulse $a$ which may have an amplitude greater than that of said leading pulse, thereby giving rise to intersymbol intereference in the output signal thereof, a correcting network for substantially reducing said intersymbol interference comprising:

(a) an input circuit for supplying a signal translated by said link;
(b) an output circuit;
(c) a wave-signal correction transmission line network interconnecting said input and output circuits and including two portions, each of said portions being divided into a plurality of sections each having a delay equal to the time separation between $a$ and $b$ and having connection taps at the junctions and terminals thereof;
(d) the first of said network portions comprising a feedback path across the first section of said network having a gain of $(-b/a)$,
(e) $(n-1)$ feed-forward paths interconnecting each of said connection taps and said output circuit and having gains of $(-b/a)^{n-2}$, $(-b/a)^{n-3}$, . . . $(-b/a)^2$, $(-b/a)^1$, and $(-b/a)^0$ commencing with the input terminal thereof,
(f) a signal repeater common to said feed-forward paths having a gain $(1-(b/a)^2)\ (1/a)$,
(g) and a signal repeater interposed between the output terminal of said network and said output circuit having a gain of $b/a$;
(h) the second of said network portions comprising a feedback path of gain $(-a/b)$ across the first section of said network and a signal repeater of gain $(1/b)$;
(i) and means for selecting the first or second of said network portions depending on whether, respectively, the magnitude of leading pulse $b$ is smaller or greater than that of trailing pulse $a$.

5. In a wave-signal translating channel including a link subject to undesired signal dispersion and multipath distortion effective to convert an input delta-function into a leading pulse $b$ and a trailing pulse $a$ which may have an amplitude greater than that of said leading pulse, thereby giving rise to intersymbol interference in the output signal thereof, a correcting network for substantially reducing said intersymbol interference comprising:

(a) an input circuit for supplying a signal translated by said link;
(b) an output circuit;
(c) and a wave-signal correction transmission line network coupling said input and said output circuits having a predetermined time delay;
(d) said correction network comprising first and second portions coupled in cascade,
(e) said first portion having the transfer function $(1/a)z^{-1}/(1+(b/a)z^{-1})$ comprising a delay section of delay equal to that between pulses $a$ and $b$ and a feedback amplifier of gain $(-b/a)$,
(f) and said second portion having a transfer function $(z^{-1}((b/a)+z^{-1})/(1+(b/a)z^{-1}))_m$, the latter being that of a filter network formed to match the impulse response of an auxiliary network comprising a two-section delay network with a feed-forward amplifier of gain $(b/a)$ across the first delay section giving a transfer function $((b/a)+z^{-1})$ and a feedback across the second delay section of gain $(-b/a)$ giving a transfer function of $1/(1+(b/a)z^{-1})$, where the parameter $z^{-1}$ in the several transfer functions represents a unit of time delay.

6. In a wave-signal translating channel including a link subject to undesired signal dispersion and multipath distortion effective to convert an input delta-function into a leading pulse A of unit amplitude and equally time-spaced trailing pulses B and C of any magnitude and polarity, the link transfer function I, expressed as $I_LI_R$ comprising a factor $I_L$ having zeros and/or poles in the left-hand p-plane or within the unit circle in the Z plane and a factor $I_R$ having zeros in the right-hand p-plane or outside the unit circle in the Z plane, the function I having any combination of its two zeros as being both within, one within and one outside, and both outside the unit circle in the z-plane, a correcting network for substantially reducing intersymbol interference comprising:

(a) an input circuit for supplying a signal translated by said link;
(b) an output circuit;
(c) three wave-signal correction transmission line networks having a predetermined time delay;
(d) the first of said correction networks, for use when both zeros of I are within the unit circle, having the transfer function $1/(1+Bz^{-1}+Cz^{-2})$ and having the configuration outlined in FIG. 16, comprising a two-tap delay line with feedback gain of $-B$ for the first tap and feedback gain of $-C$ for the second tap;
(e) the second of said correction networks, for use when one zero of I is within and the other outside the unit circle, comprising two portions in cascade, the first portion having the transfer function $$z^{-1}/(1+L_1z^{-1})(1+(1/R_1)z^{-1})$$

and the second portion having a transfer function corresponding to that of a filter matched to the impulse response of a network having a transfer function $z^{-1}((1/R_1)+z^{-1})/(1+(1/R_1)z^{-1})$ comprising a single-tap delay line with feed-forward gain of $(1/R_1)$ in cascade with a single-tap delay line with feedback gain of $-(1/R_1)$, these networks having the configuration outlined in FIG. 17;
(f) the third of said correction networks, for use when both zeros of I are outside the unit circle, comprising two portions in cascade, the first portion having the transfer function $z^{-2}/(1+(B/C)z^{-1}+(1/C)z^{-2})$ comprising a two-tap delay line with feedback gain of $-(B/C)$ for the first tap and feedback gain of $-(1/C)$ for the second tap and the second portion having a transfer function corresponding to that of a filter matched to the impulse response of a network having a transfer function $$z^{-2}((1/C)+(B/C)z^{-1}+z^{-2})/(1+(B/C)z^{-1}+(1/C)z^{-2})$$

comprising a two-tap delay line with feed-forward gain $(1/C)$ for the input, a feed-forward gain of $(B/C)$ for the first tap, and a unity feed-forward gain for the second tap, in cascade with another two-tap delay line with feedback gain of $-(B/C)$ for the first tap and feedback gain of $-(1/C)$ for the second tap, these networks having the configuration outlined in FIG. 18;

(g) and means for selectively connecting any one of said three correction networks between said input and output circuits, where the parameters $z^{-1}$ and $z^{-2}$ in the several transfer functions represent time delays of one and two units respectively; where the parameter $-L_1$ represents a zero of the factor $I_L$; and where the parameter $R_1$ represents a zero of the factor $I_R$.

No references cited.

JOHN W. CALDWELL, *Primary Examiner.*

DAVID G. REDINBAUGH, *Examiner.*

J. T. STRATMAN, *Assistant Examiner.*